(12) United States Patent
Merrill

(10) Patent No.: US 7,696,395 B2
(45) Date of Patent: Apr. 13, 2010

(54) DEHYDROGENATION AND POLYMERIZATION PROCESS

(75) Inventor: James T. Merrill, Katy, TX (US)

(73) Assignee: Fina Technology, Inc., Houston, TX (US)

( * ) Notice: Subject to any disclaimer, the term of this patent is extended or adjusted under 35 U.S.C. 154(b) by 495 days.

(21) Appl. No.: 11/811,084

(22) Filed: Jun. 8, 2007

(65) Prior Publication Data

US 2008/0306320 A1    Dec. 11, 2008

(51) Int. Cl.
C07C 5/32 (2006.01)
C07C 2/10 (2006.01)
C07C 2/24 (2006.01)

(52) U.S. Cl. .................. 585/330; 585/326; 585/329

(58) Field of Classification Search .................. 585/330, 585/326, 329
See application file for complete search history.

(56) References Cited

U.S. PATENT DOCUMENTS

| | | | |
|---|---|---|---|
| 3,635,931 A | 1/1972 | Davison | |
| 3,862,207 A | 1/1975 | Csomontanyi | |
| 4,128,708 A | 12/1978 | Liakumovich | |
| 4,822,936 A | 4/1989 | Maurer et al. | |
| 5,156,816 A | 10/1992 | Butler et al. | |
| 6,066,705 A | 5/2000 | Calderon | |
| 6,747,181 B1 | 6/2004 | Bosman et al. | |
| 6,762,335 B1 | 7/2004 | Prince et al. | |
| 7,105,711 B2 | 9/2006 | Merrill | |
| 2003/0114725 A1 | 6/2003 | Dumonteil | |

*Primary Examiner*—Thuan Dinh Dang
(74) *Attorney, Agent, or Firm*—Tenley R. Krueger

(57) ABSTRACT

Process for the production of an isoprene containing rubber compound by dehydrogenation of an isoamylene containing feedstock supplied to a dehydrogenation reactor containing a particulate dehydrogenation catalyst comprising iron and potassium and having a pore diameter of at least 500 nanometers. The dehydrogenation reactor is operated at a temperature of at least 570° C. to dehydrogenate the isoamylene to produce isoprene. The product containing isoprene and unreacted isoamylene is recovered from the dehydrogenation reactor. Isoprene is polymerized to produce an isoprene containing rubber product. An unreacted feed component containing isoamylene is separated from the rubber product and recycled to the dehydrogenation reactor.

20 Claims, 1 Drawing Sheet

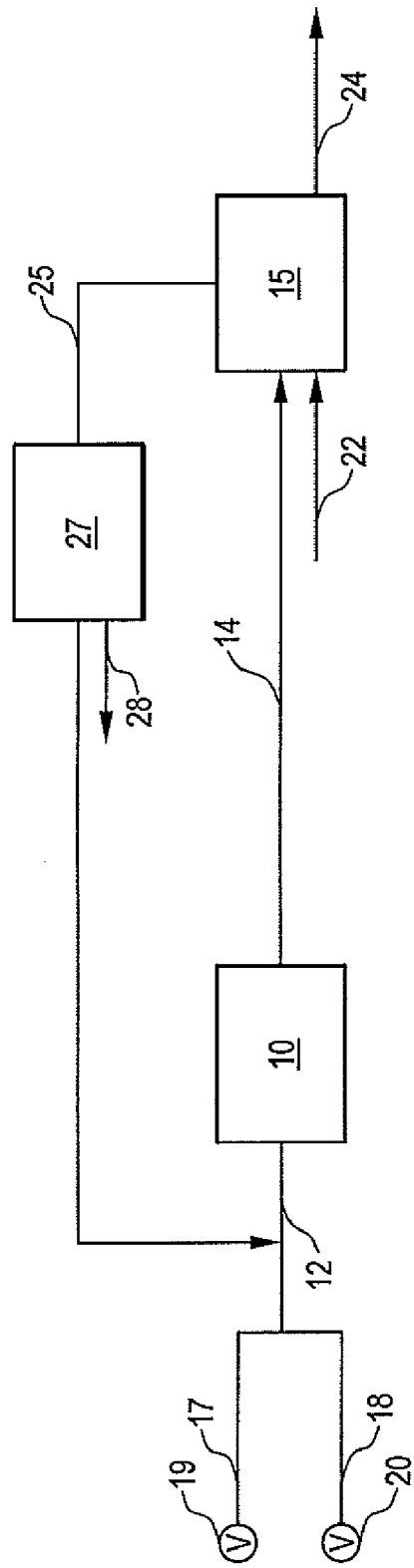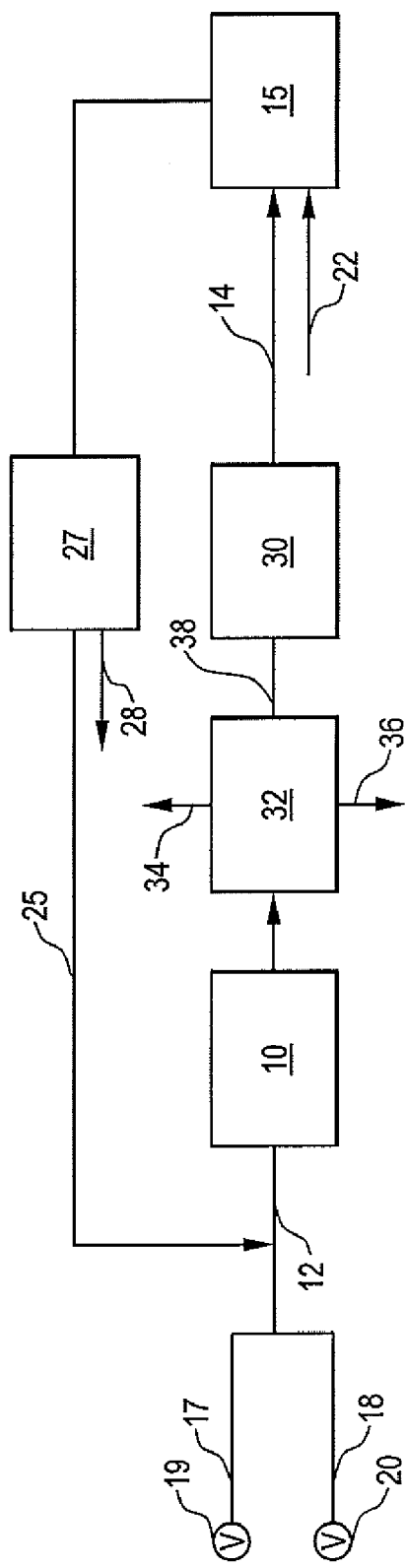

US 7,696,395 B2

DEHYDROGENATION AND POLYMERIZATION PROCESS

FIELD OF THE INVENTION

This invention relates to the polymerization of isoprene to produce an isoprene-based rubber compound and more particularly to the polymerization of isoprene produced by the dehydrogenation of isoamylene.

BACKGROUND OF THE INVENTION

Isoprene, which is found in natural rubber, is also employed to produce synthetic polymers including polyisoprene and various isoprene-based rubbery copolymers such as styrene-butadiene type copolymers. Isoprene can be recovered as a byproduct of various refining operations or it can be produced by the dehydrogenation of isoamylene which can be in thermodynamic equilibrium with other methyl butene isomers, 2-methyl 1-butene and 3-methyl 1-butene.

Isoprene containing rubber products include cis- and trans-polyisoprenes, and copolymers of isoprene and of monomers such as styrene, butadiene, isobutylene and acrylonitrate. Such products can be produced by any suitable techniques employing commercial initiators and polymerization catalysts. For example, polyisoprene may be polymerized in the presence of a coordination catalyst based upon a titanium tetrachloride with a trialkyl aluminum co-catalyst, such as triethyl aluminum. The titanium tetrachloride catalyst may be combined with either ferric or vanadium trichloride to produce a polymer having a 97% trans 1, 4 microstructure. Various other isoprene containing polymers and co-polymers may be produced employing catalyst-initiator systems which are well known skilled in the art.

SUMMARY OF THE INVENTION

In accordance with the present invention there is provided a process for the production of an isoprene containing rubber compound by a dehydrogenation process employing an isoamylene containing feedstock. In carrying out the invention, the isoamylene containing feedstock is supplied to a dehydrogenation reactor which contains a particulate dehydrogenation catalyst comprising iron and potassium. The dehydrogenation catalyst has an effective pore diameter of at least 500 nanometers. The dehydrogenation reactor is operated at a temperature of at least 570° C. under conditions effective to dehydrogenate the isoamylene in the presence of the catalyst to produce isoprene. The product containing isoprene and unreacted isoamylene is recovered from the dehydrogenation reactor. Isoprene in the recovered product is polymerized to produce an isoprene containing rubber product. An unreacted feedstream component containing isoamylene is separated from the rubber product and recycled to the dehydrogenation reactor.

In one aspect of the invention, the dehydrogenation catalyst comprises a mixture of ferric oxide and potassium carbonate having an average effective pore diameter of at least 550 nanometers, and more particularly within the range of 550-600 nanometers. The dehydrogenation reactor is operated under conditions effective to produce an isoprene content in the product recovered from the dehydrogenation reactor of at least 35 wt/%.

In a further aspect of the invention, the feedstock supplied to the dehydrogenation reactor contains a major amount of isoamylene and a minor amount of methyl-1-butene component. Specifically, the methyl-1-butene component is predominately 2-methyl 1-butene. The unreacted feedstream component which is recovered and recycled to the hydrogenation reactor includes 2-methyl-1-butene and 3-methyl-1-butene.

A further aspect of the invention involves the treatment of the product recovered from the dehydrogenation reactor when the dehydrogenation reaction is carried out with the production of alkynes as byproducts. The product from the dehydrogenation reactor is treated in order to hydrogenate at least one terminal alkyne in the product to a corresponding alkene or alkane. The selective hydrogenation reaction is accomplished by passing the product from the dehydrogenation reactor to a hydrogenation reactor containing a hydrogenation catalyst. A suitable hydrogenation catalyst employed in this embodiment of the invention comprises a palladium on a theta alumina support. After operating the hydrogenation reactor under conditions effective to selectively hydrogenate the terminal alkyne in the presence of isoprene, the product stream is then applied to a polymerization reaction zone in which the isoprene is polymerized to form an isoprene containing rubber product.

BRIEF DESCRIPTION OF THE DRAWINGS

FIG. 1 is a schematic block diagram illustrating a dehydrogenation-polymerization system suitable for us carrying out the present invention.

FIG. 2 is a schematic block diagram of another polymerization system suitable for carrying out another embodiment of the invention.

DETAILED DESCRIPTION OF THE INVENTION

The present invention involves the production of an isoprene containing a rubber product by the dehydrogenation of an isoamylene feed to form a reaction product containing a corresponding isoprene which is then subjected to polymerization in order to produce a polymeric or copolymeric rubber product. The isoamylene feed is subjected to dehydrogenation over a large pore dehydrogenation catalyst which enables dehydrogenation of the isoamylene in the presence of methyl-1 butene isomers to form a product having an isoprene content of at least 30 wt. % which in a further embodiment may range up to close to 40 wt. % isoprene. In a particular application of the invention as discussed below, the dehydrogenation catalyst is a ferric oxide, potassium carbonate based dehydrogenation catalyst having a relatively large average pore diameter. More specifically, the catalyst has an average effective pore diameter of at least 500 nanometers ranging up to in excess of 550 nanometers. In the course of carrying out the dehydrogenation reaction, the catalyst becomes progressively deactivated resulting in an increase in pressure drop across the catalyst bed and a decrease in the isoprene content of the dehydrogenated product by an incremental amount of 5 wt. %, for example, from a level of about 40 wt. % isoprene to a level of less than 35 wt % isoprene. At this stage, introduction of the isoamylene feed to the reactor is substantially reduced or even terminated and steam is introduced through the catalyst bed in order to regenerate the catalyst and increase the activity of the catalyst. Thereafter, introduction of the isoamylene containing feedstock is reinstated.

Turning now to the drawings, FIG. 1 provides a schematic illustration of a system suitable for carrying out the invention. More particularly and as illustrated in FIG. 1, there is provided a dehydrogenation reactor 10 provided with an inlet line 12 and an outlet line 14 which is connected to a polymerization reactor 15. Reactor 10 is provided with a supply line 17 for the supply of the isoamylene containing feedstock along with the steam supplied via line 18 to the reactor 10. Lines 17 and 18 are provided with control valves 19 and 20, respectively. In the normal operation of the dehydrogenation reactor, the isoamylene containing feedstock and the steam co-feed are supplied to provide a weight ratio of steam to hydrocarbon within the range of about 1:1-3:1. Alternatively, although the usual practice would be to mix the steam and hydrocarbon feeds in line 12 prior to introduction into the reactor, the steam and hydrocarbon feed can be supplied separately through the reactor through separate lines, i.e. lines 17 and 18 would be connected directly to reactor 10. The dehydrogenation product from reactor 10 is supplied via line 14 to the polymerization reactor 15. Within the polymerization reactor, the isoprene recovered from the dehydrogenation reactor 10 is subjected to a polymerization reaction in order to provide the desired rubber product. The rubber product produced here may be of any suitable type ranging from a polyisoprene homopolymer to various copolymers of isoprene such as those which are well known to those skilled in the art. Suitable copolymers which may be produced here include isoprene-styrene polymers and isoprene-acrylonitrile polymers and terpolymers such as acrylonitrile-isoprene-styrene resins. Where a copolymer is produced, an additional monomer or monomers may be introduced into the polymerization reactor via line 22. The desired rubber product is recovered from reactor 15 via a product line 24. An unreacted feed component which is not consumed by the polymerization reaction and which includes unreacted isoamylene as well as methyl-1-butene isomers is withdrawn from polymerization reactor 15 and recycled via line 25 to the dehydrogenation reactor 10. Although FIG. 1 shows the recycle line 25 connected to the inlet line 12, it is to be recognized that rather than mixing with the incoming product stream, the recycled material can be supplied separately to the reactor 10. A separator, such as a distillation unit 27, is incorporated into the recycle line 25 in order to remove undesirable components and avoid their introduction into the dehydrogenation reactor. As described in greater detail below, such materials as aromatics and other heavy hydrocarbons which boil substantially above the boiling point of the isoamylene and related 1-butene isomers may be removed from the system via line 28.

The polymerization reactor 15 may be operated under any suitable conditions depending upon the nature of the polymer product produced. Where a polyisoprene homopolymer is produced, typically the reactor may be operated at a temperature of about 50° C. and a pressure of about 5 bars. A coordination catalyst, such as a transitional metal halide, e.g. titanium tetrachloride and/or a cobalt complex may be incorporated into the reactor along with a catalyst such as triethyl aluminum (TEAL). Similar reactor conditions may be employed when the reactor is employed in a co-polymerization scheme which involves the introduction of a co-monomer such as styrene or through line 22.

As noted previously, alkynes may be produced during the dehydrogenation reaction. In order to avoid the introduction of terminal alkynes into the polymerization reaction zone, an alternative embodiment of the invention incorporating an intermediate hydrogenation zone is illustrated in FIG. 2. In FIG. 2, like components are designated by the same reference numerals as used in FIG. 1. In addition, a hydrogenation reactor 30 is interposed between the initial dehydrogenation reactor 10 and the polymerization reactor 15. A separation unit 32 is also interposed between reactors 10 and 30 in order to remove unwanted components from the product stream recovered from reactor 10 as described below.

Reactor 30 is provided with a catalyst which is effective in the selective hydrogenation of alkynes in the dehydrogenation reactor output to more saturated hydrocarbons such as the corresponding alkenes and aklanes. In the system of FIG. 2, the selective dehydrogenation catalyst may take the form of a hydrogenation catalyst comprising metallic copper or palladium on an alumina or silica support as disclosed in U.S. Pat. No. 5,156,816 to Butler et al and U.S. Pat. No. 7,105,711 to Merrill. As disclosed in Merrill, the hydrogenation catalyst can take the form of particles of metallic copper on a theta alumina support. As disclosed in Butler et al, palladium on alumina support is an effective catalyst in the hydrogenation of phenylacetylene. In order to selectively hydrogenate the alkynes in the reactor 30 without the corresponding undesirable hydrogenation of isoamylene, the reactor 30 is operated under temperature and pressure conditions of about 20-50° C. and about 1-15 bars. Palladium on a theta alumina support is a particularly effective catalyst for use in reactor 30. Other selective hydrogenation catalysts may also be employed in carrying out the invention. For a further description of suitable systems for the hydrogenation of terminal alkynes products resulting from the initial dehydrogenated operation, reference is made to the aforementioned U.S. Pat. Nos. 5,156,816 and 7,105,711, the entire disclosures of which is incorporated herein by reference.

In a further aspect of the invention, as shown in FIG. 2, a separation unit 32 is interposed between the dehydrogenation reactor 10 and the selective hydrogenation reactor 30. The separation unit 32 functions to remove gas from the dehydrogenation reactor effluent. The gas is vented via line 34 and removed from the system. In addition, water resulting from the condensation of steam and aromatics, such as styrene, are removed from unit 32 via line 36. The output from separator 32 is supplied via line 38 to selective hydrogenation reactor 30, which is operated as described above in order to hydrogenate the terminal alkynes to alkenes and possibly alkanes. Dienes which may be present in the output from the dehydrogenation reactor may be removed by any suitable treatment. For example, the dienes may be removed by adsorption or chemical treatment.

As noted previously, the dehydrogenation catalyst employed in reactor 10 is a large pore catalyst in order to avoid excessive diffusion limitations leading to undue limitations in the conversion of isoamylene to isoprene. Subject to pore diameter restrictions, the dehydrogenation reactor catalyst may be of any suitable type which will contain iron as a major component with a lesser amount of potassium. Still lesser amounts of cerium and other lanthanide group rare earths may also be present. Especially suitable catalyst compositions may comprise ferric oxide in amounts ranging from 40-80%, potassium oxide or potassium carbonate in an amount of about 5-30 wt. % with a still lesser amount of cerium and other suitable catalyst promoters. The catalyst may be formed by mulling the iron and potassium components with, for example, a plastic hydraulic cement binder followed by extruding the plastic material to form catalyst particles of about 2.5-5.0 mm in diameter having an average effective pore diameter of at least 500 nanometers. More specifically, the dehydrogenation catalyst may have an average effective pore diameter of at least 550 nanometers.

In addition to the dehydrogenation of isoamylene (2-methyl-2-butene) to isoprene, the isoamylene can also be isomerized to include 2-methyl-1 butene and 3-methyl-1 butene. The product distribution of these three isomers in the feed along with the calculated thermodynamic equilibrium distribution is set forth in Table 1.

TABLE 1

|  | Measured in Product | Thermodynamic Equilibrium | Fresh Makeup Feed | Total Reactor Feed, Wt. % |
|---|---|---|---|---|
| 2-Methyl-2-Butene (Isoamylene) | 1 | 1 | 1 | 72 |
| 2-Methyl-1-Butene | 0.605 | 0.61 | 0.09 | 23 |
| 3-Methyl-1-Butene | 0.116 | 0.16 | 0 | 5 |

In Table 1, the third column indicates the make up of the fresh feed supplied through line 17 and the fourth column indicates the make of the total feed to the reactor which is a blend of the fresh makeup feed and the recycle feed (line 25 of FIG. 2). As indicated by Table 1, the feed stream supplied to the dehydrogenation reactor will not be in equilibrium condition since it is a blend of the isoamylene in the recycle line 25 and the fresh make-up feed in line 17. The feed applied to the dehydrogenation reactor will result in a feed composition in which the isoamylene (2-methyl-2 butene) is greater than the equilibrium state. The 2-methyl-1-butene in the product issuing from the dehydrogenation reactor will be in a near equilibrium condition as indicated in Table 1.

As noted previously, the dehydrogenation of isoamylene to isoprene is accompanied by the production of alkynes. Specific alkynes identified in experimental work with respect to the invention include 3-methyl-1-butyne and 2-methyl-1-butene-3-yne.

As described above, the use of a large pore dehydrogenation catalyst in accordance with the present invention enables the isoprene yield to be increased substantially to values of 30 wt. % or more, and in further embodiments up to 40 wt. % in the product. However, the alkyne concentration in the crude isoprene product from the dehydrogenation reactor increases directly in proportion to the increase of isoprene in the product. The alkyne impurities are observed in equal concentrations regardless of whether the feed to the dehydrogenation reactor is substantially pure isoamylene (99.8 wt. % 2-methyl-2-butene) or a mixed feed, such as depicted in Table 1, in which 2-methyl-2 butene is present in an amount of about 91.6 wt. % and the 2-methyl-1-butene present in an amount of about 8.2 wt. %. In addition, the amount of alkynes in the product increases slightly as the steam to oil ratio to the dehydrogenation reactor is lowered. Desirably, the amount of terminal alkynes supplied to the polymerization reactor 15 is maintained at a level of 15 parts per million or less relative to isoprene.

In experimental work respecting the invention, the dehydrogenation of isoamylene to isoprene was carried out employing commercially available dehydrogenation catalysts identified herein as Catalysts A, B, C, and D. Catalysts A and B had average effective pore diameters of 419 nanometers (nm.) and 327 nanometers (nm.), respectively. For Catalyst C, the pore diameter was not determined, but was thought to be similar to the average effective pore diameter of Catalyst A. Catalyst D had an average effective pore diameter of 576 nanometers. Dehydrogenation runs were carried out in a laboratory reactor with temperatures ranging from about 610° C.-618° C. at a steam/hydrocarbon mole ratio of 20 and a reactor outlet pressure of 850 millibars. The space velocity (LHSV) was 0.36 hr$^{-1}$. The reaction runs were carried out to achieve an isoprene contents in the reactor output of about 35%. The temperature was then increased in an effort to increase the isoprene content to the 40% level with the result that the activity of the catalyst decreased rapidly to 36-37 wt. % isoprene content. This work suggested a "ceiling" for stable activity for Catalysts A, B, and C at an isoprene content of 35-37%. Catalyst A and C showed conversion losses of 1-2% for Catalyst A and 1-1.5% for Catalyst C. The lower pore diameter, Catalyst B (average effective pore diameter of 327 nm), showed substantially higher conversion loss of about 3-4% per day.

For the higher pore diameter Catalyst D, the 40% isoprene content in the effluent was achieved along with run lengths of two weeks at pressure drops across the reactor starting initially at 60-70 millibars. At a pressure drop across the reactor in excess of 100 millibars, the 40% isoprene content was not achieved and the catalyst required steaming in order to recover catalyst activity and decrease the pressure drop.

A temperature profile analysis for a catalyst bed having a length of 61 centimeters was carried out for the dehydrogenation Catalyst D. The isoamylene feed was supplied to the inlet of the catalyst bed at a space velocity (LHSV) of 0.36 hrs$^{-1}$. The steam/hydrocarbon mole ratio was 20. The initial outlet pressure from the reactor was 850 millibars. The bed temperature at the inlet to the reactor was about 624° C. The bed temperature fell rapidly to about 595° C. at a bed length of 10% from the inlet. At 20% of the bed length, the bed temperature leveled off at about 587° C. and thereafter remained relatively stable at about 585°-587° C. The bed temperature at the reactor outlet (100% of the catalyst bed length) was about 582° C. From this analysis, it can be seen that at about 20% of the bed length there is no further reaction leading to coke formation and the reaction becomes self-quenching.

Having described specific embodiments of the present invention, it will be understood that modifications thereof may be suggested to those skilled in the art, and it is intended to cover all such modifications as fall within the scope of the appended claims.

The invention claimed is:

1. A method for the production of an isoprene containing rubber compound comprising:
    (a) supplying steam and an isoamylene containing feedstock to a dehydrogenation reactor;
    (b) within said dehydrogenation reactor flowing said isoamylene containing feedstock into contact with a catalyst bed comprised of a particulate dehydrogenation catalyst comprising iron and potassium, said catalyst having an average effective pore diameter of at least 550 nanometers;
    (c) operating said dehydrogenation reactor at a temperature of at least 570° C. under conditions effective to dehydrogenate said isoamylene to produce a dehydrogenation product having an isoprene content of more than 37 wt. %;
    (d) recovering a product from said dehydrogenation reactor containing isoprene and unreacted isoamylene;
    (e) polymerizing isoprene in the product recovered from said reactor to produce an isoprene containing rubber product;
    (f) separating an unreacted feedstream component including isoamylene from said rubber product and recycling said unreacted feedstream component to said dehydrogenation reactor.

2. The method of claim 1 wherein said dehydrogenation catalyst comprises a mixture of ferric oxide and potassium carbonate.

3. The method of claim 1 wherein said feedstock contains a methyl-1-butene component.

4. The method of claim 3 wherein said feedstock contains a major amount of isoamylene and a minor amount of said methyl-butene component.

5. The method of claim 4 wherein said methyl 1-butene component is predominately 2-methyl 1-butene.

6. The method of claim 1 wherein unreacted feedstream component recycled to said dehydrogenation reactor includes 2-methyl 1-butene and 3-methyl 1-butene.

7. The method of claim 6 wherein at least a portion of the methyl-1 butene in the unreacted feedstream component includes methyl 1-butene isomerized from unreacted isoamylene during the dehydrogenation of isoamylene to isoprene.

8. The method of claim 7 wherein the methyl-1 butene recycled to said dehydrogenation reactor includes a mixture of 2-methyl 1 butene and 3-methyl 1-butene.

9. The method of claim 1 wherein said dehydrogenation reactor is operated at an average pressure within the range of 0.2 to 2 bars.

10. The method of claim 9 wherein the pressure drop from an inlet of the reactor to an outlet of said dehydrogenation reactor is no more than 0.2 bars.

11. The method of claim 1 further comprising prior to subparagraph (e) feeding the product recovered from said dehydrogenation reactor to selectively hydrogenate at least one terminal alkyne in said product to a corresponding alkene.

12. The method of claim 11 wherein said selective hydrogenation is accomplished by passing said product recovered from said dehydrogenation reactor into contact with a hydrogenation catalyst comprising palladium on an alumina support.

13. The method of claim 12 wherein said hydrogenation catalyst is metallic palladium on a theta alumina support.

14. The method of claim 1 further comprising periodically terminating the supply of said isoamylene containing feedstock to said dehydrogenation reactor and, while the supply of said feedstock is terminated, supplying steam to said reactor in order to regenerate said dehydrogenation catalyst.

15. The method of claim 14 wherein at least a portion of the 2-methyl-1-butene and 3-methyl-1-butene in the unreacted feedstream component includes 2-methyl-1-butene and 3-methyl-1-butene isomerized from unreacted isoamylene during the dehydrogenation of isoamylene to isoprene.

16. A method for the production of an isoprene containing rubber compound comprising:
   (a) supplying steam and a feedstock containing a mixture of isoamylene, 2-methyl-1-butene and 3-methyl-1-butene to a dehydrogenation reactor;
   (b) within said dehydrogenation reactor flowing said feedstock into contact with a catalyst bed comprising a particulate dehydrogenation catalyst comprising iron as a major component and potassium and cerium as minor components, said catalyst having an average effective pore diameter of at least 550 nanometers;
   (c) operating said reactor at a temperature of at least 570° C. under conditions effective to dehydrogenate said isoamylene in said feedstock to produce a dehydrogenation product having an isoprene content of more than 37 wt. %;
   (d) recovering a product from said dehydrogenation reactor containing isoprene and an unreacted mixture of isoamylene, 2-methyl-1-butene and 3-methyl-1-butene;
   (e) polymerizing isoprene in the product recovered from said reactor to produce an isoprene containing rubber product;
   (f) separating an unreacted feed stream component including a mixture of isoamylene, 2-methyl-1-butene and 3-methyl-1-butene from said rubber product and recycling said unreacted feed stream component to said dehydrogenation reactor.

17. A method for the production of an isoprene containing rubber compound comprising:
   (a) supplying an isoamylene containing feedstock to a dehydrogenation reactor;
   (b) supplying a steam co-feed to said dehydrogenation reactor;
   (c) within said dehydrogenation reactor flowing said isoamylene containing feedstock into contact with a catalyst bed comprising a particulate dehydrogenation catalyst comprising iron and potassium, said catalyst having an average effective pore diameter of at least 550 nanometers;
   (d) operating said reactor at a temperature of at least 570° C. under conditions effective to dehydrogenate said isoamylene to produce a dehydrogenation product having an isoprene content of more than 37 wt. %;
   (e) recovering a product from said dehydrogenation reactor containing isoprene, unreacted isoamylene and a terminal alkyne;
   (f) passing said product to a hydrogenation reactor comprising a particulate hydrogenation catalyst effective to selectively catalyze the reaction of said alkyne to a corresponding alkene;
   (g) operating said hydrogenation reactor under conditions effective to selectively hydrogenate said alkyne in the presence of isoprene;
   (h) polymerizing isoprene in the product recovered from said reactor to produce an isoprene containing rubber product;
   (i) separating an unreacted feedstream component including isoamylene from said rubber product and recycling said unreacted feedstream component to said dehydrogenation reactor.

18. The method of claim 17 further comprising, subsequent to subparagraph (e) and prior to subparagraph (f), passing said product to a separation unit for purification of said product by the removal of gas and water from said product and thereafter passing said purified product to said hydrogenation reactor.

19. The method of claim 18 wherein aromatic compounds are removed from said product in said separation unit.

20. The method of claim 17 further passing the unreacted feedstream component of subparagraph (i) to a separation unit and within said separation unit separating hydrocarbon impurities having a boiling point greater than isoamylene from said unreacted feedstream component and thereafter supplying said unreacted feedstream component to said dehydrogenation reactor.

* * * * *